United States Patent [19]

Beveridge

[11] 3,993,175

[45] Nov. 23, 1976

[54] CONTROL LEVER ASSEMBLY FOR POWER SHIFT TRANSMISSION AND MODULATING CLUTCH

[75] Inventor: Paul J. Beveridge, Springfield, Ill.

[73] Assignee: Fiat-Allis Construction Machinery, Inc., Deerfield, Ill.

[22] Filed: Oct. 23, 1974

[21] Appl. No.: 517,178

[52] U.S. Cl. .............................. 192/3.57; 192/.092; 192/109 F; 74/531; 74/471 XY; 74/483 K; 123/179 K; 251/297

[51] Int. Cl.$^2$ .................... B60K 29/00; B60K 21/00

[58] Field of Search .......................... 192/3.57, .092; 74/471 XY, 483 K, 473 P; 123/179 K

[56] References Cited

UNITED STATES PATENTS

| | | | |
|---|---|---|---|
| 2,716,474 | 8/1955 | Panish | 74/483 X |
| 2,747,035 | 5/1956 | Hansen et al. | 74/471 XY |
| 3,095,754 | 7/1963 | Mayon et al. | 74/471 XY |
| 3,292,751 | 12/1966 | McRay et al. | 192/3.57 |
| 3,352,392 | 11/1967 | Black et al. | 192/3.57 |
| 3,550,466 | 12/1970 | Ham | 74/471 XY |
| 3,811,020 | 5/1974 | Johnson et al. | 123/179 K |

*Primary Examiner*—Benjamin W. Wyche
*Attorney, Agent, or Firm*—Thomas F. Kirby; Robert A. Brown

[57] ABSTRACT

The power train of a crawler tractor comprises a hydraulically operated modulating main clutch (operated by a clutch control valve) for transmitting motive power from the tractor engine to a hydraulically operated reversible multi-speed range power shift transmission (operated by a shift selector valve) for varying the speed at the output shaft of the transmission. A control lever assembly at the tractor operator's station comprises a manually operable gear selector lever and a manually operable safety lever. The gear selector lever is pivotally mounted on an oscillatable shaft and movable laterally in opposite directions from a centered neutral position to rotate the oscillatable shaft and thereby operate the shift selector valve (connected to the oscillatable shaft) and shift the transmission to either first or second speed ranges in either forward or reverse direction. The gear selector lever extends through a slot in a U-shaped bracket which is mounted for fore and aft pivotal movement and is connected by specially-shaped cam means to operate the clutch control valve. The gear selector lever is also pivotally movable fore and aft in any selected speed range to effect corresponding fore and aft movement of the bracket and thereby operate the clutch control valve to cause transmission output shaft speed to vary in the speed range selected. An adjustable friction assembly imposes drag on the gear selector lever to provide control "feel" for the operator. The safety lever is pivotally mounted for fore and aft movement between engine-start and engine-run position and, when placed in engine-start position, actuates an electric safety switch which enables the tractor engine to be started. Interlock means connected to and between the gear selector lever and the safety lever ensure that the safety lever cannot be placed in engine-start position unless the shift selector lever is placed in neutral.

27 Claims, 8 Drawing Figures

CONTROL LEVER ASSEMBLY FOR POWER SHIFT TRANSMISSION AND MODULATING CLUTCH

BACKGROUND OF THE INVENTION

1. Field of Use

This invention relates generally to control lever assemblies for valve-operated hydraulic power shift transmissions and modulating master clutches such as are used in the power train on crawler tractors or the like. In particular, it relates to control lever assemblies having a manually operable gear selector lever for operating both the shift control valve for the transmission and the clutch control valve, and a manually operable safety lever for preventing engine-starting unless the transmission is in neutral.

2. Description of the Prior Art

In some control lever assemblies of the aforesaid character, the gear selector lever is movable laterally in opposite directions from a centered neutral position to forward or reverse speed range positions and is further movable fore and aft in each speed range position between slow and fast positions. The gear selector lever is connected to operate the shift selector valve for the transmission when moved laterally and is further connected to operate the modulating clutch control valve for the modulating clutch when moved fore and aft. The safety lever, which is movable fore and aft between an engine-start position to an engine-run position, is connected to operate an electric switch which must be actuated by placement of the safety lever in engine-start position before the engine can be started. The gear selector lever and safety lever are interlocked or interconnected so that the safety lever cannot be placed in engine-start position unless the gear selector lever (and transmission) is in neutral. Some prior art control lever assemblies of this type employed a very complex arrangement of linkages and bellcranks and were relatively difficult and costly to manufacture, install, adjust and service. Furthermore, speed variation in the speed range selected was rather limited and not always directly related to tractor speed and power requirements in particular situations.

SUMMARY OF THE INVENTION

The power train of a crawler tractor comprises a hydraulically operated modulating main clutch (operated by a clutch control valve) for transmitting motive power from the tractor engine to a hydraulically operated reversible multi-speed range power shift transmission (operated by a shift selector valve) for varying the speed at the output shaft of the transmission. A control lever assembly at the tractor operator's station comprises a manually operable gear selector lever and a manually operable safety lever. The gear selector lever operates both valves and controls the direction and speed of tractor movement and the safety lever operates an electric safety switch and insures that the tractor engine can be started only when the transmission is in neutral and the master clutch is disengaged. More specifically, the gear selector lever is mounted on an oscillatable shaft which is connected by a linkage to the valve spool of the shift selector valve and is movable laterally in opposite directions from a centered neutral position to either first or second speed range positions in either forward or reverse positions. Such lateral movement causes rotation of the oscillatable shaft and effects operation of the shift selector valve and corresponding operation of the transmission. The gear selector lever is also pivotally movable fore and aft on the oscillatable shaft between slow and fast positions in each selected speed range. Such fore and aft movement effects operation of a valve spool of the clutch control valve. More specifically, the gear selector lever extends upwardly through a laterally disposed slot in an inverted U-shaped bracket member which is mounted for fore and aft pivotal movement and which is connected by cam means to operate the valve spool of the clutch control valve. The slot in the bracket permits lateral movement of the gear selector lever independently of its fore and aft movement. The cam means comprise a cam follower which is attached to the bracket and rides in a cam slot in a cam and a linkage connects the cam directly to the clutch control valve. The cam is mounted for upward and downward pivotal movement. Thus, fore and aft movement of the gear selector lever (and corresponding movement of the bracket and cam follower thereon) operates the clutch control valve which controls the hydraulic oil pressure and rate of fluid flow to the modulating master clutch and thereby operates the clutch control valve to cause the transmission output shaft speed to vary in the speed range selected. By moving the gear selector lever rearward the cam follower forces the cam downward. This forces the valve spool in the control valve down, thus partially or fully engaging the modulating clutch and permitting tractor movement. The cam slot is specially shaped so that the cam forces the valve spool to move rapidly at first, then slows the spool down through the primary modulating range (speed control range) and then speeds up the spool again at the rear end of the cam, to insure complete engagement of the clutch for fastest tractor speed. The gear selector lever can be stopped at any point in any position to permit the tractor to travel in either direction at any speed the operator desires.

The pivotally mounted safety lever, which is movable fore and aft from an engine-start position to an engine-run position, is connected to operate an electric switch which must be actuated by placement of the safety lever in engine-start position before the tractor engine can be started. Interlock means are connected to and between the gear selector lever and the safety lever to ensure that the safety lever cannot be placed in engine-start position unless the shift selector lever is placed in neutral. More specifically, the oscillatable shaft on which the gear selector lever is pivotally mounted is provided with a downwardly depending pin which is engageable with a notch on a member connected to the safety lever when the safety lever is in engine-start position and the gear selector lever is in neutral.

An adjustable friction assembly is provided to give control feel for the operator and comprises two friction discs and two plates which are forced together by a spring and exert force on the bracket. Thus, the friction assembly causes drag on the gear selector lever when the latter is moved in the fore and aft direction. The friction device can be adjusted by means of a nut to give the machine operator any feel he wants and is also wear-compensating.

A control lever assembly in accordance with the invention is simpler than prior art assemblies and is easier and less costly to manufacture, install, adjust and service. Furthermore, such a control lever assembly in accordance with the invention provides better performance than prior art apparatus, since the cam mechanism for operating the clutch control valve enables increased controllability of the modulating clutch and better speed regulation in the speed range selected. In particular, clutch controllability is enhanced in the initial or primary modulating range thereby allowing, in effect, infinitely variable speed in the speed range selected. Other objects and advantages of the invention will hereinafter appear.

DRAWINGS

DESCRIPTION OF A PREFERRED EMBODIMENT

Figure 1:
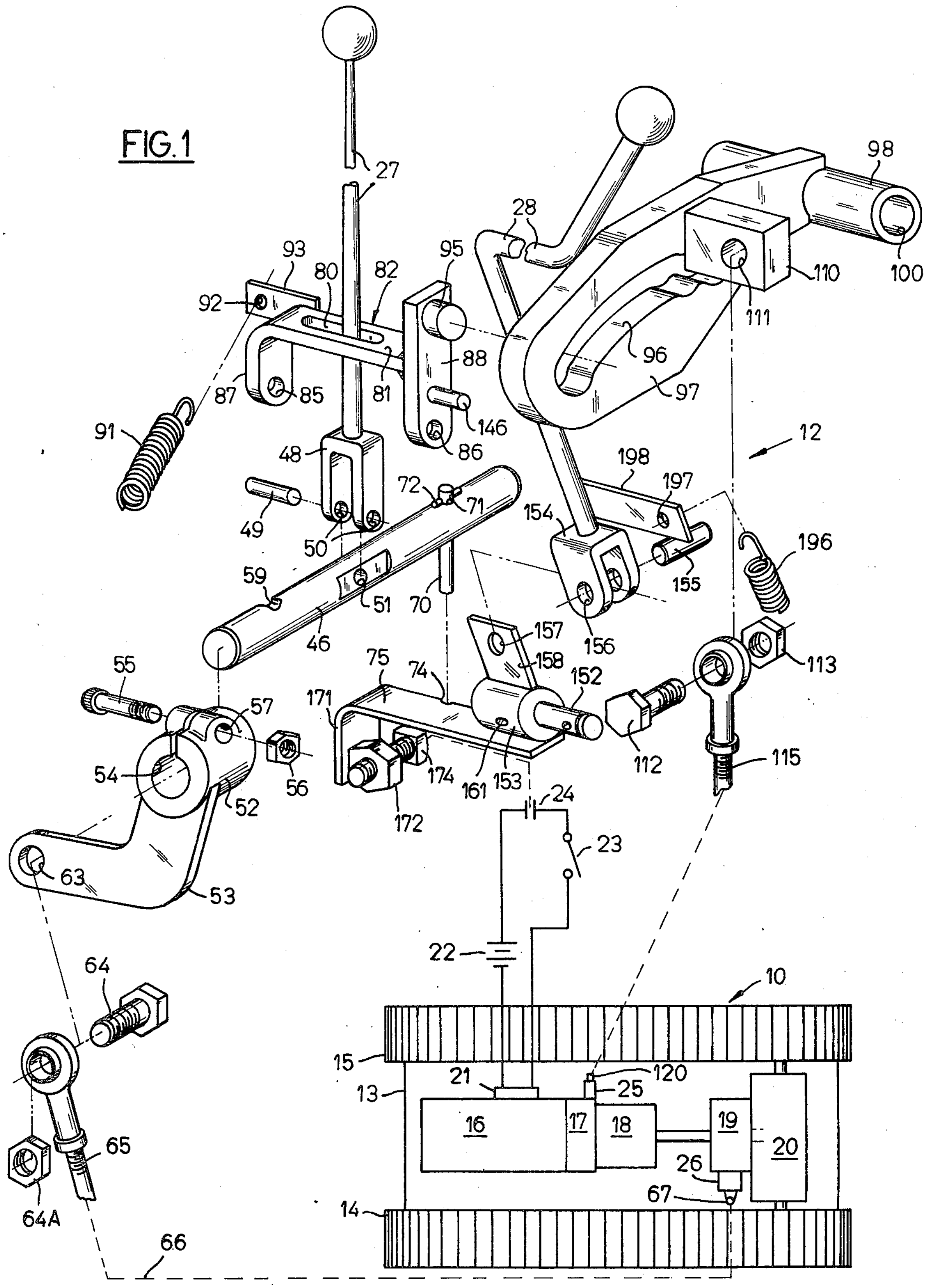
FIG. 1 is a schematic showing of a crawler tractor and includes an isometric view of portions of a control lever assembly in accordance with the invention.

Referring to FIG. 1, the numeral 10 designates a crawler tractor of the type in which a control lever assembly 12 in accordance with the invention is advantageously employed. Tractor 10 comprises a main frame 13 on which are mounted left and right crawler tracks 14 and 15, respectively, which are driven by an engine 16 operating through a power train comprising a hydraulically operated modulating clutch 17, a torque converter 18, a hydraulically operated power shift transmission 19 and a final drive 20. The engine 16 is provided with a conventional electric starter 21 energizable from a battery 22 when an operator-controlled starter switch 23 and a safety switch 24 in series therewith are both closed. The safety switch 24, which is located on the control lever assembly 12, is ultimately operated by a safety lever 28 which is part of the control lever assembly 12, as hereinafter described, and must be closed before engine 16 can be started. The modulating clutch 17 is provided with a modulating clutch control valve 25 having a movable valve spool 120 and the transmission 19 is provided with shift selector valve 26 having a movable valve spool 67, both of which are ultimately operated by a gear shift selector lever 27 which is part of the control lever assembly 12, as hereinafter described.

The shift selector valve 26 operates to determine whether the transmission 19 is in neutral, forward or reverse and also operates to determine whether the transmission operates in the first (low) speed range or in the second (high) speed range in either forward or reverse.

The clutch control valve 25 operates to determine the extent to which the modulating clutch 17 is engaged so that the speed of the final drive 20 can be varied between slow and fast in each of the two speed ranges (slow and fast) available in forward and reverse.

Generally considered, the manually operated gear selector lever 27 of control lever assembly 12 is connected to control the valves 25 and 26 and provides for controlling the speed and direction of tractor movement. The manually operated safety lever 28 is connected to operate safety switch 24 and is interlocked with lever 27 to insure that the tractor engine 16 can be started only when the transmission 19 is in neutral and the master clutch 17 is disengaged. As FIG. 5 makes clear, both levers 27 and 28 extend upwardly through guide slots 27A and 28A, respectively, in a lever guide plate 33 in assembly 12.

Figure 5:
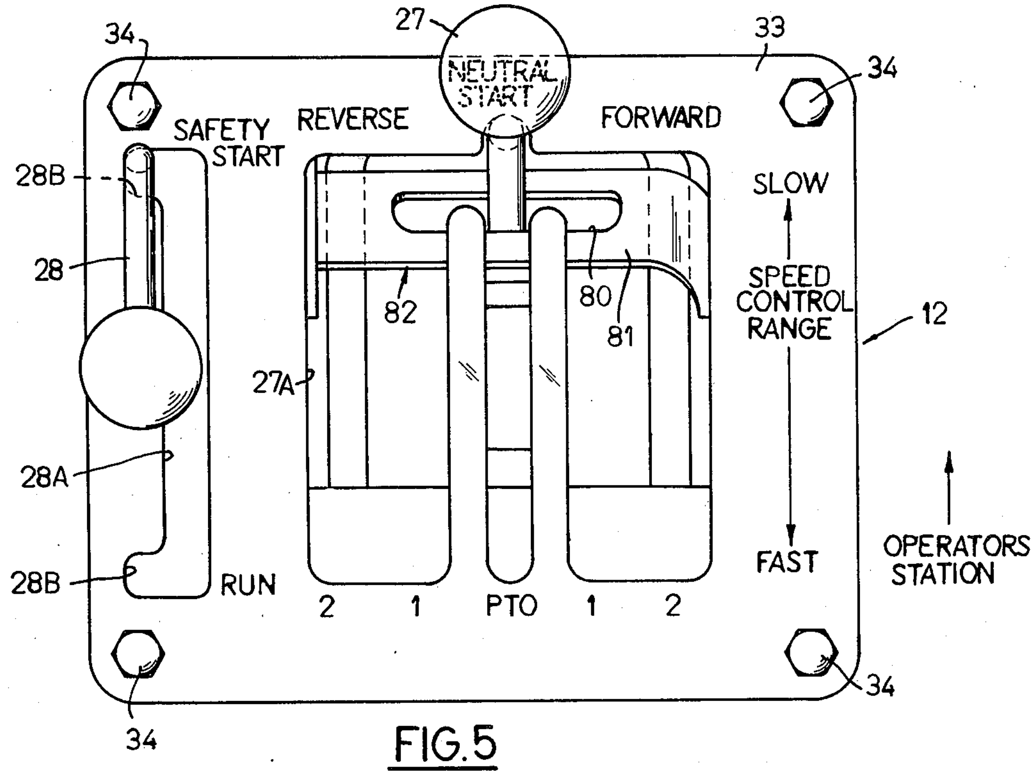
FIG. 5 is a top plan view of the control lever assembly shown in FIGS. 2 and 3.

As FIG. 5 shows, the gear selector lever 27 is movable laterally in slot 27A in opposite directions from a centered neutral position (designated "NEUTRAL START") to either first or second speed range positions (designated "1" and "2") in either forward or reverse positions (designated "FORWARD" and "REVERSE"). Such lateral movement effects operation of the shift selector valve 26. The gear selector lever 27 is also movable fore and aft between "SLOW" and "FAST" positions in each selected speed range (first or second) in either forward or reverse. The lever 27 is also movable fore and aft between slow and fast positions in a power take-off position (designated "PTO") directly behind its neutral position. Such fore and aft movement of lever 27 effects operation of the clutch control valve 25.

The safety lever 28 is movable fore and aft in slot 28A between engine-start and engine-positions (designated "START" and "RUN," respectively). Such fore and aft movement effects operation of safety switch 24. With safety lever 28 in START or RUN position, switch 24 is closed or open, respectively. Slot 28A has locking cutouts 28B at opposite ends thereof wherein lever 28 is biased, as hereinafter explained, to maintain the lever 28 locked in desired position.

Figure 2:
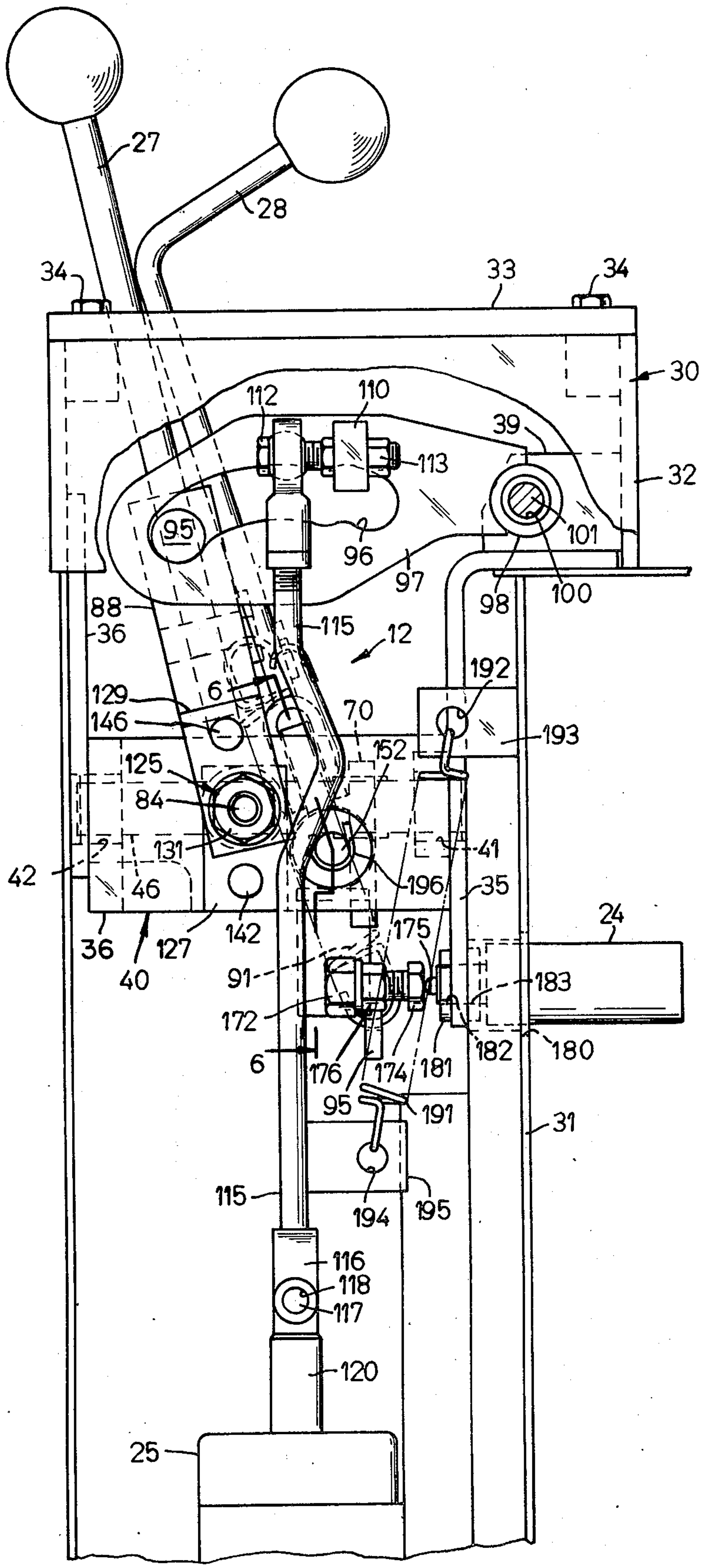
FIG. 2 is a side elevational view of a complete control lever assembly such as is shown in FIG. 1.
Figure 3:
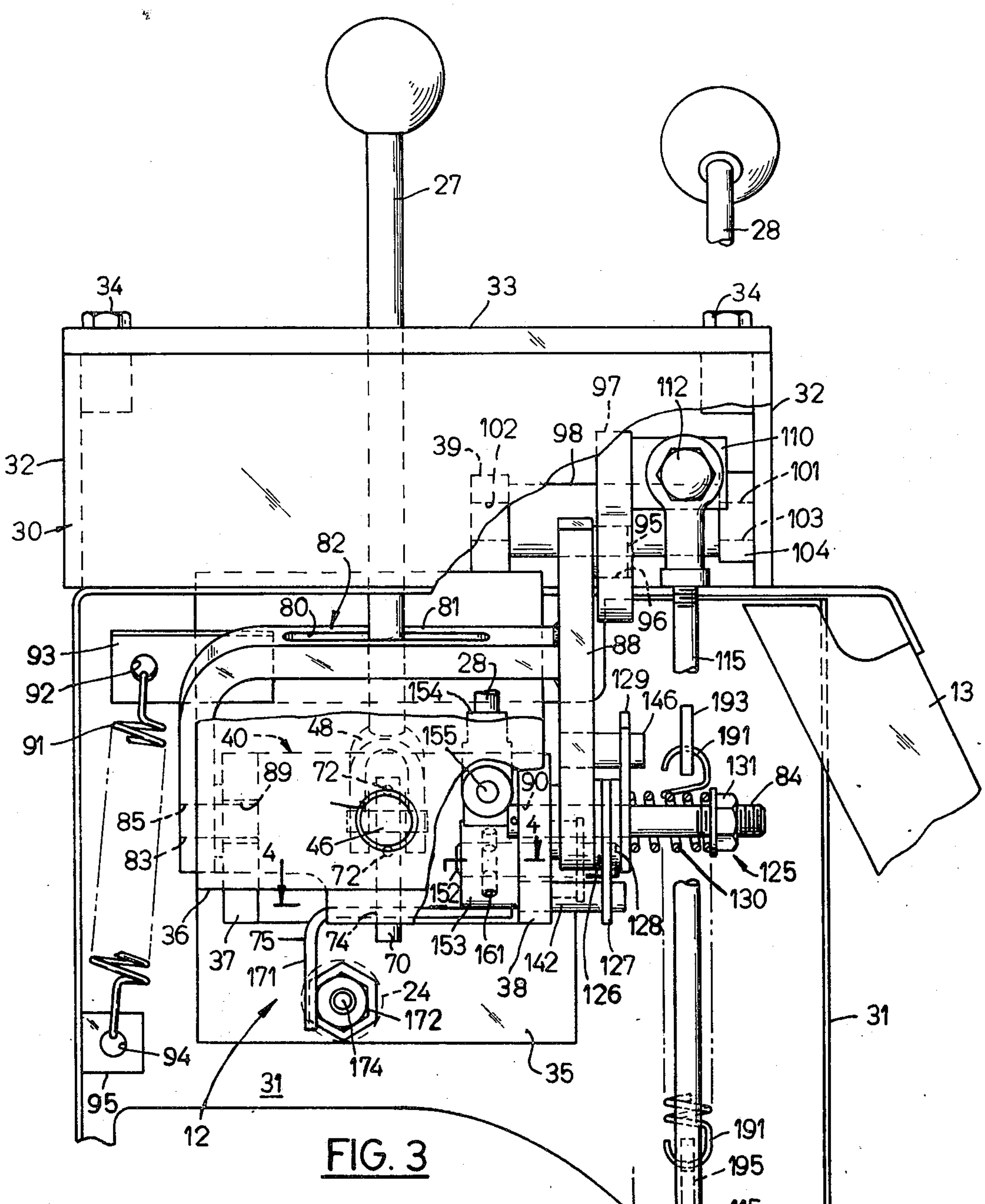
FIG. 3 is a front elevational view of the control lever assembly shown in FIG. 2.

Referring to FIGS. 2 and 3, the control lever assembly 12 comprises a rigid supporting framework 30, on which constituent components are mounted and which adapt the assembly for mounting on tractor 10. A protective sheet metal housing 31 is attached to framework 30. Framework 30 comprises a rectangular upper section 32 on top of which the slotted lever guide plate 33 is rigidly secured by bolts 34 and from which rear and front support plates or brackets 35 and 36, respectively, rigidly depend. A one-piece U-shaped bracket 40 having right and left flat laterally spaced apart side plates 37 and 38, respectively, extend between and are rigidly secured to the rear and front plates 35 and 36, respectively. A support bracket 39 is rigidly secured between the bent-over top portion of rear support plate 35 and the rear side of upper section 32.

Referring to FIGS. 1, 2 and 3, the rear and front support plates 35 and 36, respectively, are provided with hollow cylindrical bushings 41 and 42, respectively, for receiving and oscillatably supporting the ends of a longitudinally disposed cylindrical oscillatable shaft 46. The lower end of gear selector lever 27 is provided with a clevis 48, and a pin 49 extends through holes 50 in the clevis and a pin hole 51 in shaft 46 to secure and pivotally mount lever 27 on the shaft 46. A bellcrank 53 having a shaft-receiving hole 54 in the split hub 52 thereof fits on the front end of shaft 46 and is secured thereto for rotation therewith by means of a bolt 55 and a nut 56. The bolt 55 extends through a hole 57 in the split flange of the bellcrank hub 52 and engages a groove 59 in shaft 46. The arm of bellcrank 53 is provided with a hole 63 for receiving a bolt 64 (having a nut 64A) which pivotally connects the upper end of a control rod 65 to the bellcrank. It is to be understood that the lower end of control rod 65 is connected by suitable means, as indicated by the broken line 66 in FIG. 1, to operate the axially movable valve spool 67 on the shift selector valve 26 for the power shift transmission 19. Lateral movement of gear selector lever 27 effects corresponding oscillation or rotation of shaft 46 and the bellcrank 53 thereon to operate the shift selector valve 26 between neutral, first and second forward and first and second reverse.

A safety pin 70 extends through a vertical hole 71 provided in shaft 46 near the rear end thereof and is secured in depending position by two cotter keys or pins 72. Pin 70 is engageable with a notch 74 in the rear edge of a bracket member 75 which is connected to the safety lever 28. Pin 70 and notch 74 form part of the means for interlocking gear selector lever 27 and safety lever 28 so that engine 16 cannot be started unless lever 27 is in neutral and lever 28 is in start position, as hereinafter explained.

Gear selector lever 27 extends upwardly through a laterally disposed slot 80 in the upper portion 81 of a generally U-shaped bracket 82 which is mounted for pivotal movement in the fore and aft directions on framework 30 by means of pins 83 and 84 which engage holes 85 and 86, respectively, in the depending legs 87 and 88, respectively, of bracket 82. The pins 83 and 84 also engage holes 89 and 90 in the side plates 37 and 38, respectively, of framework 30. Fore and aft pivotal movement of the gear selector lever 27 causes corresponding pivotal movement of the bracket 82, but the slot 80 permits lateral movement of lever 27 without effecting movement of bracket 82. A tension-type wound biasing spring 91 is hooked at its upper end in a hole 92 in a spring connection bracket 93 which is rigidly secured to bracket 82. The lower end of spring 91 is hooked in a hole 94 in a spring connector bracket 95 which is rigidly secured to a side of housing 31. Spring 91 biases bracket 82 and gear selector lever 27 toward the front side of the lever assembly 12.

Attached to the upper portion of leg 88 of bracket 82 is a cam follower 95 which rides in a cam slot 96 in a cam or cam plate 97. Cam plate 97 is provided with a hollow hub 98 rigidly secured to the rear end of the cam and adapts the cam to be mounted for upward and downward pivotal movement in response to fore and aft pivotal movement of bracket 82 and the cam follower 95 which is rigidly secured to the bracket. Hub 98 has a pin hole 100 therethrough which accommodates a pivot pin or shaft 101 which has its opposite ends journalled in a pin-receiving hole 102 in support bracket 39 and in a pin-receiving hole 103 in a support block 104 rigidly secured to a side wall of upper section 32 of framework 30.

Cam plate 97 has a bracket 110 rigidly secured to the outer side thereof for movement therewith. Bracket 110 is provided with a hole 111 for receiving a bolt 112 (having a nut 113) which pivotally connects the upper end of a control rod 115 to the bracket 110. The lower end of control rod 115 has a clevis 116, and a pin 117 extends through holes 118 in the clevis and a pin hole 119 in an axially movable valve spool 120 on the modulating clutch control valve 25, as FIGS. 2 and 3 show.

A tension type wound biasing spring 191 is hooked at its upper end in a hole 192 in a spring connector bracket 193 which is rigidly secured to the rear wall of housing 31. The lower end of spring 191 is hooked in a hole 194 in a spring connector bracket 195 which is rigidly secured to the control rod 115. Spring 191 tends to bias the control rod 115 and the valve spool 120 connected thereto upward to valve closed (i.e., slow clutch speed) position. Thus, fore and aft movement of the gear selector lever 27 effects corresponding movement of bracket 82 and cam follower 95 thereby effecting vertical movement of cam plate 97 and rod 115 to operate the clutch control valve 25 which controls the hydraulic oil pressure and rate of fluid flow to the modulating master clutch 17.

Figure 8:
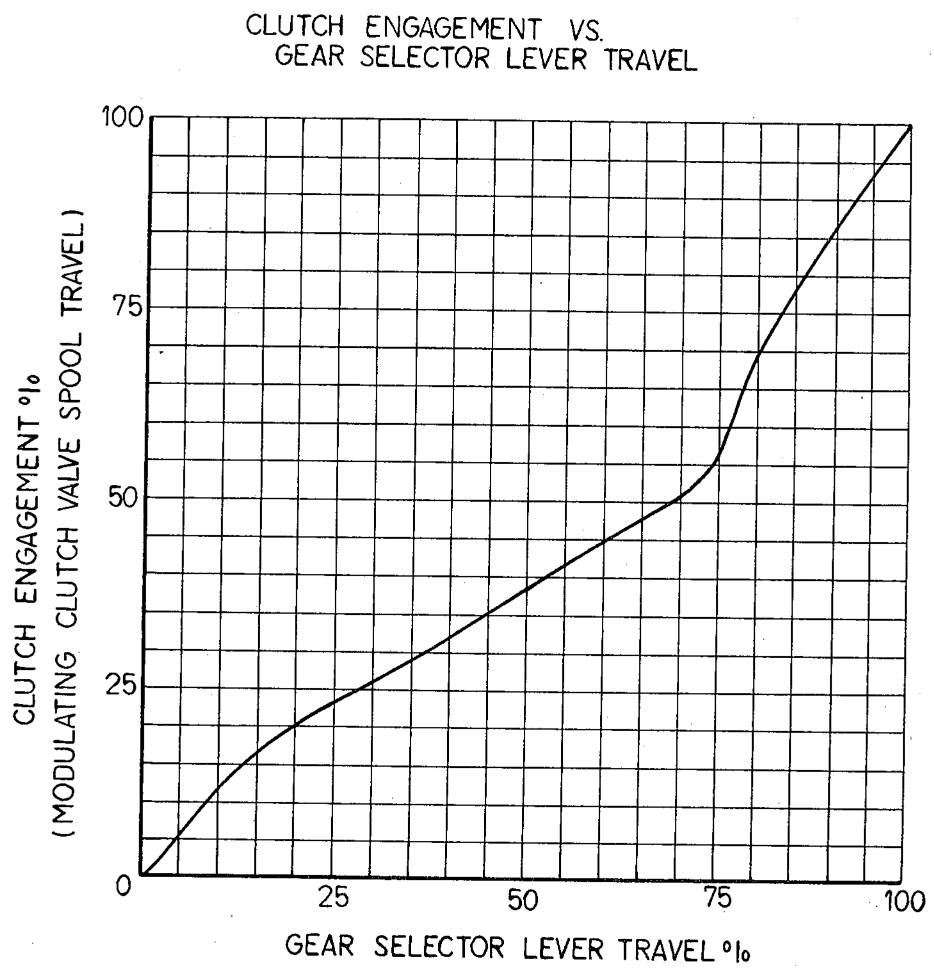
FIG. 8 is a graph showing the percentage of gear selector travel plotted against the percentage of clutch engagement effected thereby.

The gear selector lever 27 is connected, as aforedescribed, to the shift selector valve 26, and lateral movement of the gear selector lever 27 (possible because of slot 80 in bracket 82) effects shifting of the shift selector valve 26 between neutral, first and second forward and first and second reverse positions. By moving the gear selector lever 27 rearward, the cam follower 95 forces the cam 97 downward. This forces the valve spool 120 in control valve 25 down, thus partially or fully engaging the modulating clutch 17 and permitting tractor movement at some speed within the speed range selected. The cam slot 80 is shaped so that cam 97 forces the valve spool 120 to move rapidly at first, then slows the spool down through the primary modulating range (speed control range) and then speeds up the spool again at the rear end of the cam, to insure complete engagement of the clutch 17 for fastest tractor speed. The gear selector lever 27 can be stopped at any point through this movement to permit the tractor to travel at any speed the operator desires. The graph in FIG. 8 shows the effect of movement of lever 27 on clutch engagement as a result of the shape of cam slot 96.

Figure 7:
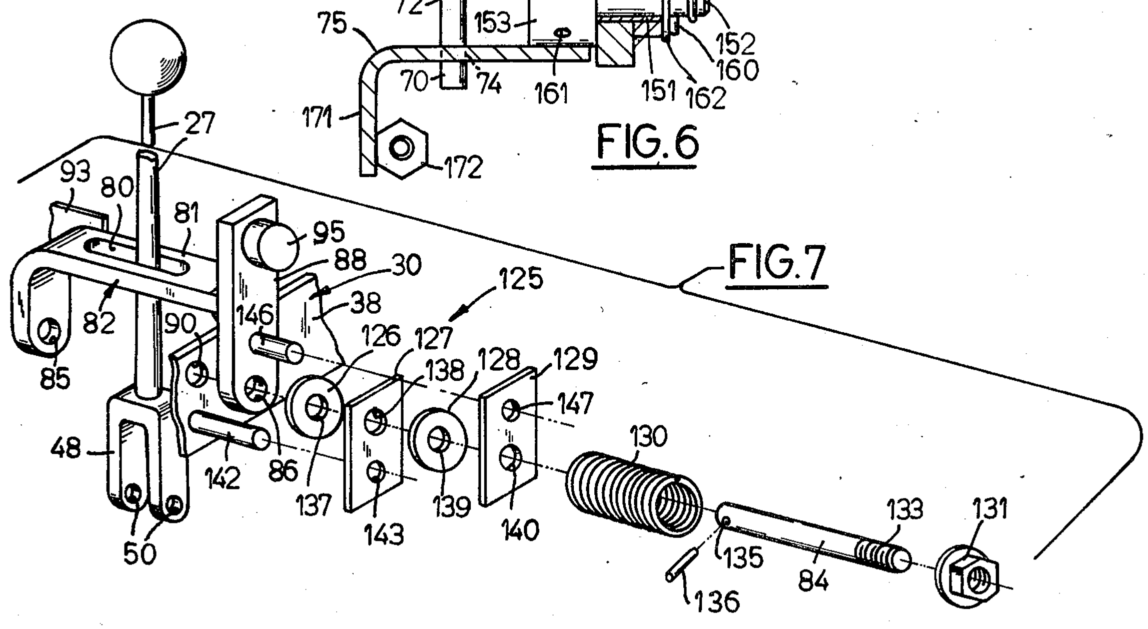
FIG. 7 is an isometric view of an adjustable friction assembly associated with the lower end of the gear selector lever.

FIGS. 2, 3 and 7 show that an adjustable friction assembly 125 is provided for the gear selector lever 27 to provide the tractor operator with a feel of this control by causing drag on lever 27 when it is moved in the fore and aft direction. The friction assembly 125 generally comprises two circular washer-like friction discs 126 and 128, perferably formed of plastic material impregnated with asbestos fibers, and two rectangular metal plates 127 and 129 which are disposed on the pin 84 on which member 82 pivots and are forced together by a coiled compression spring 130 so as to exert force on bracket 82. More specifically, the inner surface of leg 88 of U-shaped bracket 82 is disposed adjacent the outer surface of side plate 38 of framework 30. Friction disc 126 is located between the outer side of leg 88 and the metal plate 127. Friction disc 128 is located between the metal plates 127 and 129. Spring 130 is located between metal plate 129 and a flanged nut 131 which takes up on the threaded portion 133 on one end of pin 84. The other end of pin 84 has a pin hole 135 which accommodates a roll pin 136 which prevents withdrawal of the pin 84 from the holes through which it extends. Pin 84 extends through hole 90 in side plate 38, through hole 86 in leg 88, through holes 137, 138, 139 and 140 in the members 126, 127, 128 and 129, respectively, through spring 130, and through flanged nut 131. The plate 127 is secured against rotation by means of a pin 142 rigidly secured to and extending outwardly from stationary side plate 38 and through a pin hole 143 in plate 127. The plate 129 is secured to and rotatable with bracket 82 by means of a pin 146 which is rigidly secured to and extends outwardly from the leg 88 of bracket 82 and through a pin hole 147 in plate 129. The relative movement of the plates 127 and 129 with respect to the discs 126 and 128 produces the desired friction and consequent feel. The friction assembly 125 can be adjusted by tightening or loosening nut 131 to give the operator any feel he wants. The nut 131 can also be taken up or tightened to compensate for wear of the friction discs 126 and 128.

Figure 6:
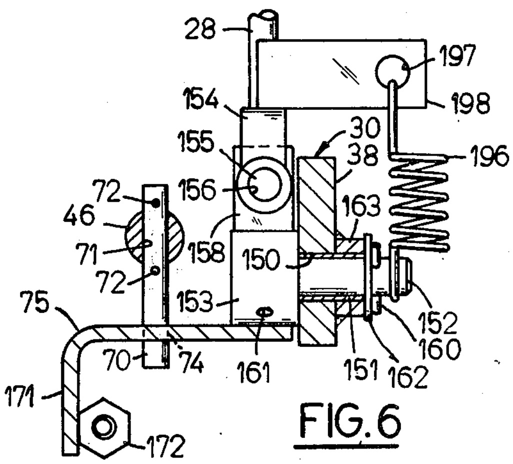
FIG. 6 is a detail view, partly in section, taken on line 6—6 of FIG. 2.

FIGS. 2, 3, 4 and 6 show the means by which safety lever 28 is mounted and connected. The left support plate 38 of framework 30 is provided with a spacer 163 welded thereto and a hole 150 extending therethrough is provided with a bushing or sleeve bearing 151 therein through which extends a pivot shaft 152 which is rigidly secured to and extends outwardly from a cylindrically shaped lever support block 153. Pin 152 is held in block 153 by means of a roll pin 161. Block 153 is rigidly secured as by welding to bracket 75 and both oscillate together but are secured against lateral displacement by a cotter key or pin 160 which extends through a hole in pivot shaft 152 and bears against a washer 162 on pivot shaft 152. The lower end of safety lever 28 is provided with a clevis 154, and a pin 155 extends through holes 156 in the clevis and a pin hole 157 in a bracket 158 welded to the upper portion of support block 153 to secure safety lever 28 to the block. Pin 155 is transverse, i.e., at right angles, to pivot shaft 152 so that safety lever 28 can be moved fore and aft between engine-start position (wherein it closes safety switch 24) and engine-run position wherein it opens switch 24. The safety lever 28 can be pivoted or oscillated laterally about pin 155 to enable it to be locked in either of the RUN or START positions by engagement with the cutouts or notches 28B in the end of slot 28A. A tension-type wound biasing spring 196 is hooked at its upper end in a hole 197 in a spring connector bracket 198 which is rigidly secured to safety lever 28. The lower end of spring 196 is hooked around the end of shaft 152, as FIG. 6 shows. Spring 196 tends to bias safety lever 28 sideways into engagement with the notches 28B in slot 28A in guide plate 33 to maintain it locked in those positions.

The L-shaped bracket 75 is rigidly secured to the underside of block 153 and is movable therewith as safety lever 28 is operated. The downwardly depending leg 171 of bracket 75 is provided with switch actuating means for operating safety switch 24 and such means take the form of a nut 172 rigidly secured as by welding to leg 171 and having a bolt 174 extending rearwardly therefrom for making contact with actuator 175 of switch 24. Bolt 174 is adjustable inwardly or outwardly so that it makes proper contact with switch actuator 175. A locknut 176 is provided on bolt 174 so that the bolt can be locked in a desired position.

Safety switch 24 is a conventional normally open on-off switch having contacts which close when its outwardly biased switch actuator button 175 is depressed. Switch 24 extends through a hole 180 in housing 31 and is secured in place by a lock-nut 181 which takes on to a threaded portion 182 which extends through a hole 183 in rear plate 35 of framework 30.

Figure 4:
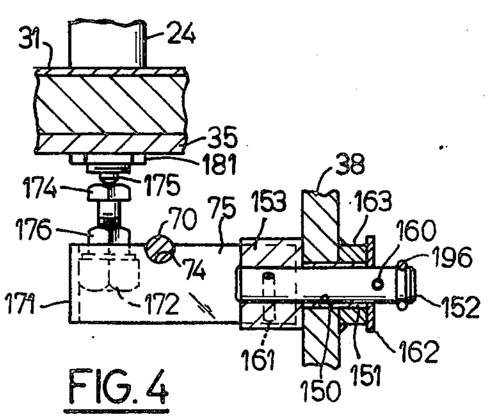
FIG. 4 is a detail view, partly in section, taken on line 4—4 of FIG. 3.

As FIGS. 3, 4 and 6 show, interlock means are connected to and between the gear selector lever 27 and the safety lever 28 to insure that the safety lever 28 cannot be placed in engine-start position (to effect closure of safety switch 24) unless the shift selector lever 27 is first placed in neutral. Such interlock means comprise the pin 70 which depends from and moves with oscillatable shaft 46 and the notch or slot 74 in the rear edge of the L-shaped bracket 75, which bracket is movable in response to movement of safety lever 28. As FIG. 4 best shows, the bracket 75 (and thus safety lever 28) cannot be moved into position to actuate (close) safety switch 24 unless pin 70 is in the position shown in FIG. 4. However, pin 74 cannot assume the position shown in FIG. 4 unless the shift select lever 27 is in neutral. It is to be noted that the slight sideways pivotal movement that safety lever 28 is capable of in order to engage the locking cutouts 28B in slot 28A of plate 33, does not effect any movement of bracket 75 or change the position of notch 74 therein.

In the foregoing description of the invention the terms fore, aft, lateral, upward and downward, front and rear and similar relative terms are used to describe the relative movements of components in a clear and understandable manner. However, such terms are not to be construed as limiting the scope of invention since it will be apparent to those skilled in the art that the control lever assembly 12 and certain components therein could be mounted in various positions and locations on a tractor.

I claim:

1. In a control lever assembly for operating a shift selector valve for shifting a power shift transmission into a selected speed range and for operating a clutch control valve for a modulating main clutch to achieve speed changes in the selected speed range: a support; a shaft oscillatably mounted on said support to operate said shift selector valve; a bracket member pivotably mounted on said support and having an aperture therein; cam means comprising two relatively movable interengageable cam components, one cam component being connected to and movable with said bracket member, the other cam component being mounted for movement on said support and connected to operate said clutch control valve in response to movement of said bracket member; and a control lever pivotally mounted on said shaft and extending through said aperture in said bracket member, said control lever being movable in one direction in said aperture to rotate said shaft and effect operation of said shift selector valve without effecting movement of said bracket member, said control lever being further movable in another direction to pivot said bracket member and effect operation of said clutch control valve.

2. A control lever assembly according to claim 1 wherein said cam means are shaped so as to operate said clutch control valve at different rates of speed, as said control lever is moved in said other direction, to ensure complete engagement of said clutch in a fast speed range.

3. A control lever assembly according to claim 2 wherein said cam means is shaped so as to operate said clutch control valve rapidly at first and then more slowly in the principal clutch modulating range and then rapidly again, as said control lever is moved in said other direction, to ensure complete engagement of said clutch in said fast speed range.

4. A control lever assembly according to claim 1 wherein said one cam component comprises a cam follower and said other cam component comprises a cam plate having a slot formed therein engaged with said cam follower.

5. A control lever assembly according to claim 1 including frictional means disposed between said bracket member and said support to provide frictional drag when said bracket member is moved.

6. A control lever assembly according to claim 5 wherein said frictional means is adjustable to vary the frictional drag imposed on said bracket member.

7. In a control lever assembly for operating a shift selector valve for shifting a power shift transmission into a selected speed range and for operating a clutch control valve for a modulating main clutch to achieve speed changes in the selected speed range: a support; a shaft mounted on said support and oscillatable about a first axis to operate said shfit selector valve; a bracket member mounted on said support and pivotable about a second axis transverse to said first axis, said bracket member having an aperture therein; cam means comprising two relatively movable interengageable cam components, one cam component being connected to and movable with said bracket member, the other cam component being mounted for movement on said support and movable to operate said clutch control valve in response to movement of said bracket member; and a control lever pivotally mounted on said shaft and extending through said aperture in said bracket member, said control lever being movable in one direction in said aperture to rotate said shaft and effect operation of said shift selector valve without effecting movement of said bracket member, said control lever being further movable in another direction transverse to said one direction to engage and pivot said bracket member and effect operation of said clutch control valve.

8. A control lever assembly according to claim 7 wherein said cam means are shaped so as to operate said clutch control valve at different rates of speed, as said control lever is moved in said other direction, to ensure complete engagement of said clutch in a fast speed range.

9. A control lever assembly according to claim 8 wherein said cam means is shaped so as to operate said clutch control valve rapidly at first, then more slowly in the principal clutch modulating range and then rapidly again, as said control lever is moved in said other direction, to ensure complete engagement of said clutch in said fast speed range.

10. A control lever assembly according to claim 7 wherein said one cam component comprises a cam follower and said other cam component comprises a cam plate having a slot formed therein engaged with said cam follower.

11. A control lever assembly according to claim 7 including frictional means disposed between said bracket member and said support to provide frictional drag when said bracket member is moved.

12. A control lever assembly according to claim 11 wherein said frictional means is adjustable to vary the frictional drag imposed on said bracket member.

13. In a control lever assembly having a shift selector lever and a safety lever, said shift selector lever operating a shift selector valve for shifting a power shift transmission into a selected speed range and operating a clutch control valve for a modulating main clutch to achieve speed changes in the selected speed range, said safety lever operating a safety switch in the engine-starting circuit: a support; a shaft oscillatably mounted on said support and connectable to operate said shift selector valve; a bracket member pivotably mounted on said support and having an aperture therein; cam means comprising two relatively movable interengageable cam components, one cam component being connected to and movable with said bracket member, the other cam component being mounted for movement on said support and connected to operate said clutch control valve in response to movement of said bracket member; said shift selector lever being pivotally mounted on said shaft and extending through said aperture in said bracket member; said shift selector lever being movable in one direction in said aperture to rotate said shaft and effect operation of said shift selector valve without effecting movement of said bracket member; said shift selector lever being further movable in another direction to pivot said bracket member and effect operation of said clutch control valve; said safety lever pivotally mounted on said support and movable to effect operation of said safety switch; and interengageable means connected to and movable with said shift selector lever and connected to and movable with said safety lever to prevent said safety lever from effecting operation of said safety switch unless said shift selector lever is in a predetermined position wherein said transmission is in neutral.

14. A control lever assembly according to claim 13 wherein said interengageable means comprises a projecting member mounted on said shaft and a projecting member mounted on and movable with said safety lever.

15. In a control lever assembly for operating three control elements: a support; a shaft oscillatably mounted on said support and connectable to operate a first one of said control elements; a bracket member pivotably mounted on said support and having an aperture therein; cam means comprising two relatively movable interengageable cam components, one cam component being connected to and movable with said bracket member, the other cam component being mounted for movement on said support and connected to operate a second one of said control elements in response to movement of said bracket member; a first control lever pivotally mounted on said shaft and extending through said aperture in said bracket member; said first control lever being movable in one direction in said aperture to rotate said shaft and effect operation of said first one of said control elements without effecting movement of said bracket member; said first control lever being further movable in another direction to pivot said bracket member and effect operation of said second one of said control elements; a second control lever pivotally mounted on said support and movable to effect operation of a third one of said control elements; and interengageable means connected to and movable with said first control lever and connected to and movable with said second control lever to prevent said second control lever from effecting operation of said third one of said control elements unless said first control lever is in a predetermined position.

16. A control lever assembly according to claim 15 wherein said interengageable means comprises a projecting member mounted on said shaft and a projecting member mounted on and movable with said second control lever.

17. In a control lever assembly for operating a shift selector valve for shifting a power shift transmission into a selected speed range in either forward or reverse and for operating a clutch control valve for a modulating main clutch to achieve speed changes between slow and fast in the selected speed range: a support; a shaft oscillatably mounted on said support to operate said shift selector valve; a bracket member pivotably mounted on said support and having an aperture therein; cam means comprising two relatively movable interengageable cam components, one cam component being connected to and movable with said bracket member, the other cam component being mounted for movement on said support and connected to operate said clutch control valve in response to movement of said bracket member; and a control lever pivotally mounted on said shaft and extending through said aperture in said bracket member, said control lever being movable in said aperture from a neutral position to predetermined speed range positions to rotate said shaft and effect operation of said shift selector valve without effecting movement of said bracket member, said control lever being further movable between slow and fast positions in each speed range position to pivot said bracket member and effect operation of said clutch control valve, said cam means being shaped so as to operate said clutch control valve, as said control lever is moved from slow position to fast position, rapidly at first, then more slowly in the principal clutch modulating range and then rapidly again to insure complete engagement of the clutch in the fast position.

18. In a control lever assembly for operating two control elements: a support; a shaft oscillatably mounted on said support to operate one of said control elements; a bracket member pivotably mounted on said support and having an aperture therein; cam means comprising two relatively movable interengageable cam components, one cam component being connected to and movable with said bracket member, the other cam component being mounted for movement on said support and connected to operate the other of said control elements in response to movement of said bracket member; and a control lever pivotally mounted on said shaft and extending through said aperture in said bracket member; said control lever being movable in one direction in said aperture to rotate said shaft and effect operation of said one control element without effecting movement of said bracket member, said control lever being further movable in another direction to pivot said bracket member and effect operation of said other control element, said cam means being shaped so as to operate said other control element at different rates of speed, as said control lever is moved in said other direction.

19. A control lever assembly according to claim 18 wherein said cam means is shaped so as to operate said other control element rapidly at first and then more slowly and then rapidly again, as said control lever is moved in said other direction.

20. In a control lever assembly for operating two control elements: a support; a shaft oscillatably mounted on said support to operate one of said control elements; a bracket member pivotably mounted on said support and having an aperture therein; cam means comprising two relatively movable interengageable cam components, one cam component being connected to and movable with said bracket member, the other cam component being mounted for movement on said support and connected to operate the other of said control elements in response to movement of said bracket member; and a control lever pivotally mounted on said shaft and extending through said aperture in said bracket member; said control lever being movable in one direction in said aperture to rotate said shaft and effect operation of said one control element without effecting movement of said bracket member, said control lever being further movable in another direction to pivot said bracket member and effect operation of said other control element, said one cam component comprising a cam follower and said other cam component comprising a cam plate having a slot formed therein engaged with said cam follower.

21. In a control lever assembly for operating two control elements: a support; a shaft oscillatably mounted on said support to operate one of said control elements; a bracket member pivotably mounted on said support and having an aperture therein; cam means comprising two relatively movable interengageable cam components, one cam component being connected to and movable with said bracket member, the other cam component being mounted for movement on said support and connected to operate the other of said control elements in response to movement of said bracket member; a control lever pivotally mounted on said shaft and extending through said aperture in said bracket member; said control lever being movable in one direction in said aperture to rotate said shaft and effect operation of said one control element without effecting movement of said bracket member, said control lever being further movable in another direction to pivot said bracket member and effect operation of said other control element; and frictional means disposed between said bracket member and said support to provide frictional drag when said bracket member is moved.

22. A control lever assembly according to claim 21 wherein said frictional means is adjustable to vary the frictional drag imposed on said bracket member.

23. In a control lever assembly for operating two control elements: a support; a shaft mounted on said support and oscillatable about a first axis to operate one of said control elements; a bracket member mounted on said support and pivotable about a second axis transverse to said first axis, said bracket member having an aperture therein; cam means comprising two relatively movable interengageable cam components, one cam component being connected to and movable with said bracket member, the other cam component being mounted for movement on said support and movable to operate the other of said control elements in response to movement of said bracket member; and a control lever pivotally mounted on said shaft and extending through said aperture in said bracket member, said control lever being movable in one direction in said aperture to rotate said shaft and effect operation of said one control element without effecting movement of said bracket member, said control lever being further movable in another direction transverse to said one direction to engage and pivot said bracket member and effect operation of said other control element, said cam means being shaped so as to operate said other control element at different rates of speed, as said control lever is moved in said other direction.

24. A control lever assembly according to claim 23 wherein said cam means is shaped so as to operate said other control element rapidly at first and then more slowly and then rapidly again, as said control lever is moved in said other direction.

25. In a control lever assembly for operating two control elements: a support; a shaft mounted on said support and oscillatable about a first axis to operate one of said control elements; a bracket member mounted on said support and pivotable about a second axis transverse to said first axis, said bracket member having an aperture therein; cam means comprising two relatively movable interengageable cam components, one cam component being connected to and movable with said bracket member, the other cam component being mounted for movement on said support and movable to operate the other of said control elements in response to movement of said bracket member; and a control lever pivotally mounted on said shaft and extending through said aperture in said bracket member, said control lever being movable in one direction in said aperture to rotate said shaft and effect operation of said one control element without effecting movement of said bracket member, said control lever being further movable in another direction transverse to said one direction to engage and pivot said bracket member and effect operation of said other control element, said one cam component comprising a cam follower and said other cam component comprising a cam plate having a slot formed therein engaged with said cam follower.

26. In a control lever assembly for operating two control elements: a support; a shaft mounted on said support and oscillatable about a first axis to operate one of said control elements; a bracket member mounted on said support and pivotable about a second axis transverse to said first axis, said bracket member having an aperture therein; cam means comprising two relatively movable interengageable cam components, one cam component being connected to and movable with said bracket member, the other cam component being mounted for movement on said support and movable to operate the other of said control elements in response to movement of said bracket member; a control lever pivotally mounted on said shaft and extending through said aperture in said bracket member, said control lever being movable in one direction in said aperture to rotate said shaft and effect operation of said one control element without effecting movement of said bracket member, said control lever being further movable in another direction transverse to said one direction to engage and pivot said bracket member and effect operation of said other control element; and frictional means disposed between said bracket member and said support to provide frictional drag when said bracket member is moved.

27. A control lever assembly according to claim 26 wherein said frictional means is adjustable to vary the frictional drag imposed on said bracket member.

* * * * *